Jan. 19, 1971     B. LICHTENSTERN     3,556,666

TELESCOPIC GUNSIGHT INCLUDING LEVEL MEANS

Filed Aug. 1, 1967     3 Sheets-Sheet 1

INVENTOR:
Benjamin LICHTENSTERN
BY Arthur O. Klein
his Attorney

Jan. 19, 1971  B. LICHTENSTERN  3,556,666
TELESCOPIC GUNSIGHT INCLUDING LEVEL MEANS
Filed Aug. 1, 1967  3 Sheets-Sheet 3
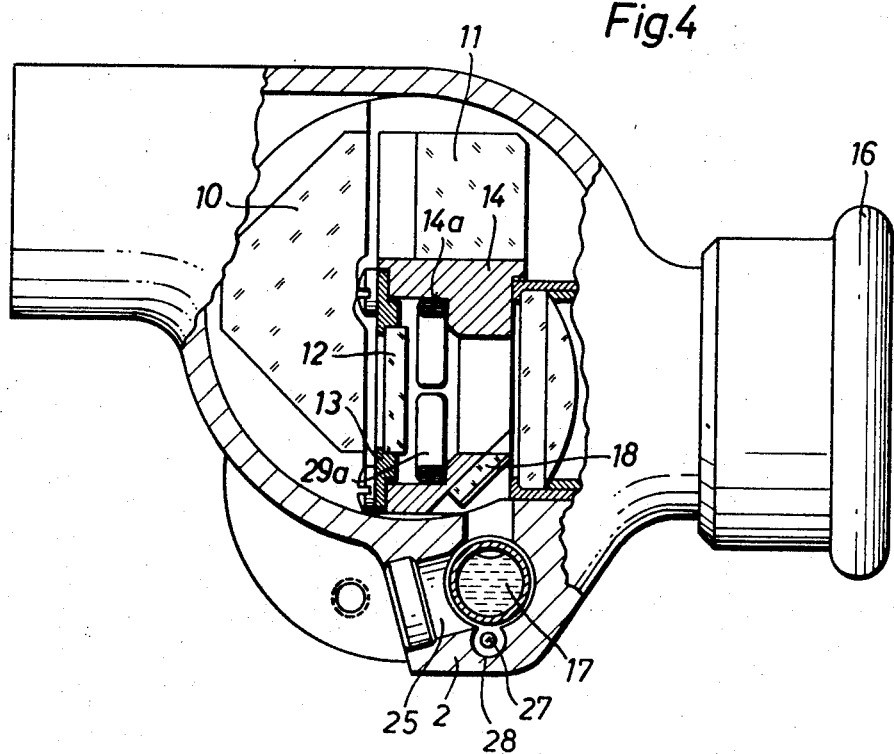
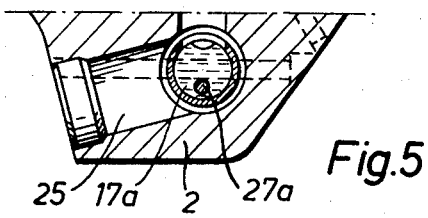
INVENTOR:
Benjamin LICHTENSTERN
BY
Arthur O. Klein
his Attorney United States Patent Office 3,556,666
Patented Jan. 19, 1971

3,556,666
TELESCOPIC GUNSIGHT INCLUDING
LEVEL MEANS
Benjamin Lichtenstern, Haifa, Israel, assignor to
Etablissement SALGAD, Vaduz, Liechtenstein
Filed Aug. 1, 1967, Ser. No. 657,679
Claims priority, application Germany, Oct. 22, 1966,
E 32,713
Int. Cl. G01c 9/18
U.S. Cl. 356—249                                    5 Claims

ABSTRACT OF THE DISCLOSURE

A telescopic gunsight, particularly adapted for use with weapons such as mortars, the gunsight having a telescope housing which carries in its interior an optical means providing a viewing field. A level means is carried by the housing for indicating the attitude thereof, and an image-transmitting means is carried by the housing and coacts with the level means for providing an image of the latter in the viewing field, so that the operator can see the attitude of the gunsight. An illuminating means, which preferably is self-illuminating so that it requires no outside source of power, coacts with the level means to render the latter visible at night.

BACKGROUND OF THE INVENTION

The present invention relates to gunsights.

In particular, the present invention relates to gunsights adapted to be mounted on weapons such as mortars.

Gunsights of this type are generally mounted on suitable holders carried by the weapon, so that when mounted on the holder the sight can be used for aiming the weapon at a given target. Conventional gunsights of this type are relatively complex and inconvenient to manipulate, so that their adjustment and use cannot quickly and conveniently be carried out. Moreover, conventional sights are of a delicate construction and are not generally equal to the stresses to which they are subjected in connection with their use on guns which must be fired.

Furthermore, while it is possible to provide satisfactory illumination for the sight under daylight conditions, illumination at night or under conditions where only small amounts of light are available, require an outside source of power, such as source of electricity, and this requirement also is of considerable disadvantage.

SUMMARY OF THE INVENTION

It is accordingly a primary object of the present invention to provide a telescopic gunsight of the above general type which is of a simple construction and is exceedingly convenient to manipulate in such a way that a rapid and faultless adjustment of the sight, to provide sighting on the target, will be achieved.

A further object of the invention is to provide a sight of the above general type which is of an extremely robust construction, so that it will be equal to the stresses which are encountered during use of the gun.

In addition, it is an object of the present invention to provide an exceedingly compact telescopic gunsight enabling the components thereof to be situated in an extremely small amount of space.

Furthermore, it is an object of the present invention to provide a telescopic gunsight which makes it possible to render parts thereof visible under conditions of low light, such as at night, without requiring the use of an outside source of current.

In addition, it is an object of the present invention to provide a gunsight which will enable the gunner to effectively determine the attitude, both laterally and with respect to horizontal axis of the gun, so that it can be easily controlled and actuated.

According to the invention, the telescopic gunsight includes a telescope housing carrying a level means for indicating the attitude thereof in the viewing field of the telescope, this viewing field being provided by an optical means which is carried in the telescope housing. The level means is provided with its own individual source of illumination. In order to provide the operator with an image of the level means, an image-transmitting means is carried by the telescope housing, and this image-transmitting means includes a reflector situated between the ocular assembly of the gunsight and a reticle plate thereof, this reflector being directed toward the level means and toward the ocular assembly for directing to the latter an image of the level means.

In order to illuminate the level means under daylight conditions the housing is provided with a window through which light can reach the level means. Under conditions of darkness or low light, however, the level means as well as the reticle plate can be illuminated by self-illuminating light sources, respectively, which are arranged within the housing of the telescopic sight. Preferably the illumination of the level means and the reticle plate are derived from tritium tubes.

As a result of the construction of the invention, the level means and the reticle plate are provided with a good illumination in an exceedingly compact construction which requires only a small amount of space. The illumination of the telescope sight at night is independent of a source of current which must be replaced periodically. The illuminating capacity of tritium tubes extends over several years. At the same time it is possible with the structure of the invention during sighting on a given target, to indicate, by means of the telescopic sight itself, the lateral position of the weapon as well as the tilted position thereof with a single glance at the level means in a manner which requires only an exceedingly small amount of time, so that the position of the weapon can easily be corrected to direct it toward the desired target. The arrangement of the components of the telescopic sight of the invention is brought about in such a way that only an extremely small amount of space is required. As a result, the weight of the telescopic sight is reduced, and the result is an extremely advantageous relationship with respect to the stresses and life of the directional device which carries the telescopic sight of the invention.

According to a further feature of the invention the level means is capable of being adjusted in an extremely simple manner. For this purpose the level means is situated in its own level housing which at one end is turnable about a pin carried by the telescope housing and which at its other end is situated within an eccentric bearing so that when the latter is turned the level means adjusts itself. With this construction it is possible to adjust the level in the telescope housing in a simple, rapid, and stepless manner.

The illuminating units are preferably fixed to their support by being cemented thereto. Such a cemented mounting can also be used for glass bodies, such as the prisms of the optical means of the telescopic sight of the invention. Such prisms may be cemented to metal parts which are removably fixed with the telescope housing as by suitable screws, pins, or the like. In this way an economical mounting, which is resistant to impact, is achieved, and at the same time the components can be easily exchanged whenever required.

BRIEF DESCRIPTION OF DRAWINGS

The invention is illustrated by way of example in the accompanying drawings which form part of this application and in which:

FIG. 4 is a fragmentary longitudinal section, similar to FIG. 1, but showing another embodiment of a structure according to the invention; and FIG. 5 is a fragmentary section of a variation of the embodiment of FIG. 4.

DESCRIPTION OF PREFERRED EMBODIMENTS

Figure 1:
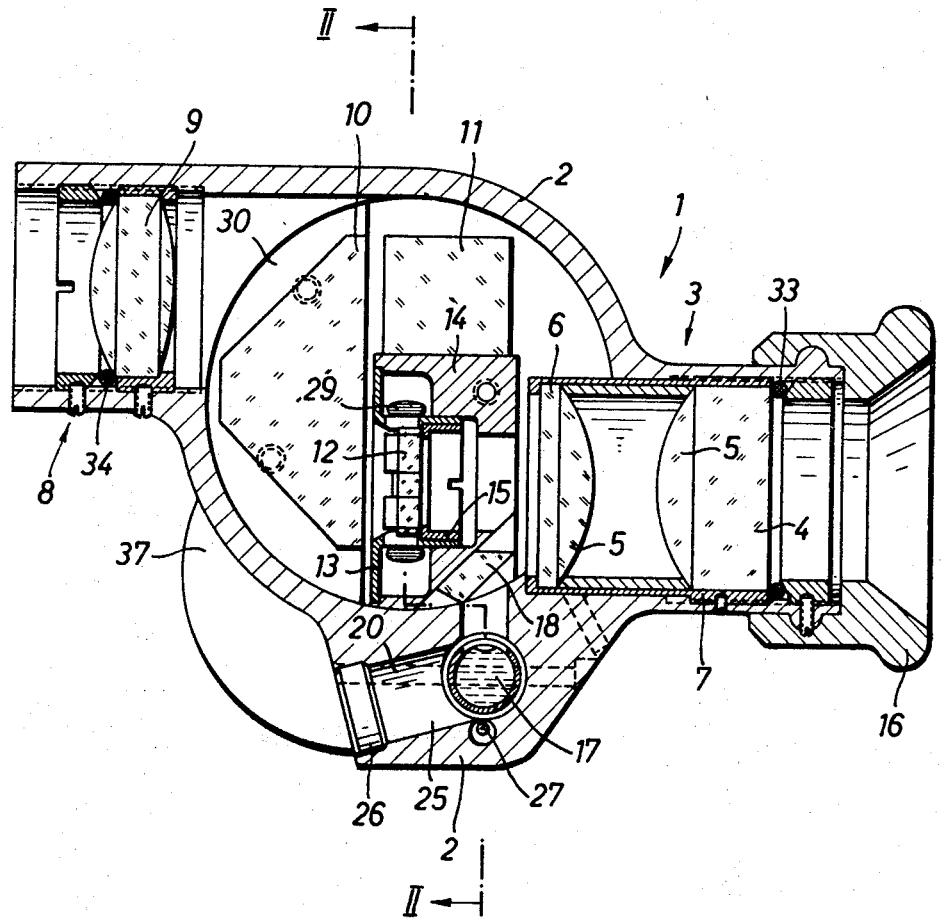
FIG. 1 is longitudinal sectional elevation of one possible embodiment of a telescopic gunsight according to the invention, taken along line I—I of FIG. 2 in the direction of the arrows.
Figure 2:
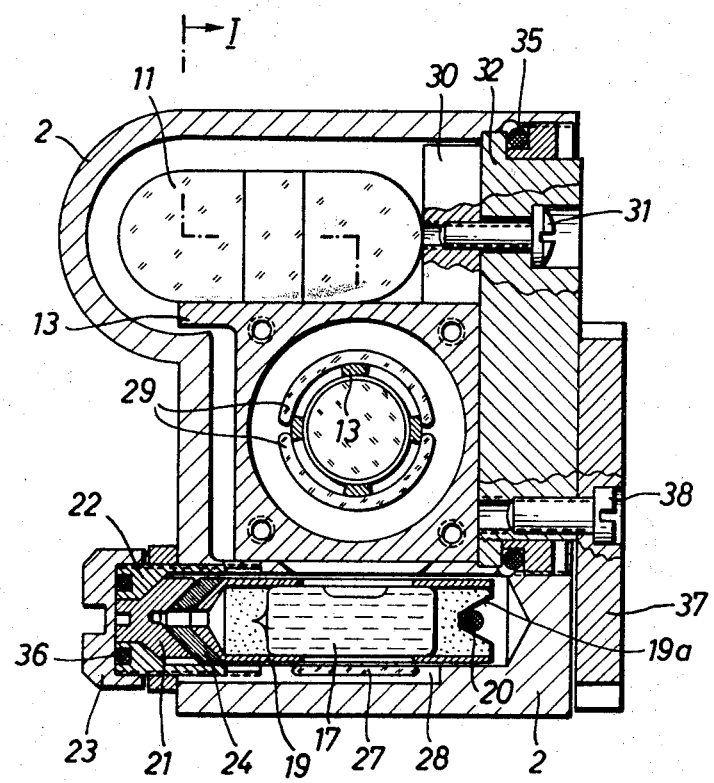
FIG. 2 is a transverse view of the gunsight of FIG. 1, taken along line II—II of FIG. 1 in the direction of the arrows.
Figure 3:
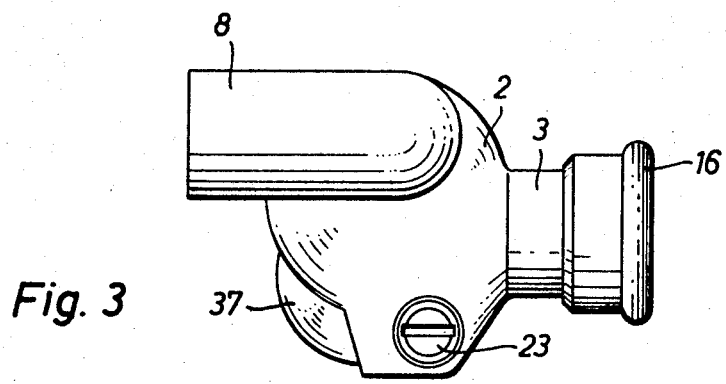
FIG. 3 is an exterior side elevation of the gunsight of the invention, FIG. 3 showing the sight approximately at its actual size.

Referring now to FIGS. 1–3, the telescopic gunsight 1 of the invention is provided with a telescopic housing 2, which carries in its interior an optical means for providing a viewing field, through which the target can be seen. This optical means includes the rear ocular assembly 3, which includes the lenses 4, 5 and 6, which are situated within the lens housing or sleeve 7. The optical means also includes a front objective assembly 8, including a plurality of lenses 9. Moreover, within the telescope housing 2 are situated the prism bodies 10 and 11. Between the prism body 10 and the ocular assembly 3 is situated the reticle plate 12 which is held by a carrier 13 which in turn is fixed with a reticle plate housing 14. In order to determine the position of the reticle plate, a nut 15 is provided. The ocular assembly 3 is provided in a conventional manner with an exterior rubber sleeve 16.

Within the telescope housing 2 there is situated a level means 17 which is built directly into the housing 2 and which includes a bubble the position of which will indicate the attitude of the sight and the weapon which carries the same. An image-transmitting means is provided for directing into the viewing field an image of the level means 17. This image-transmitting means includes a reflector 18 which is situated beneath the viewing field and which will direct an image of the level means 17 through the ocular to the operator whose eye is placed at the open end of the sleeve 16. Thus, the image-transmitting means 18 is situated between the reticle plate 12 and the ocular assembly 3 and is directed toward the level means 17 for directing an image of the latter rearwardly through the ocular assembly to be rendered visible to the operator just beneath the viewing field provided by the optical means of the telescope sight.

The level means 17 is situated in its own level housing 19 which is provided at one end with a V-shaped notch 19a which receives a cross pin 20 which is carried directly by the housing 2 and which provides for the housing 19 and the level means 17 a turning axis enabling the level means to be adjusted about the cross pin 20. At its end distant from the cross pin 20, the housing 19 is adjustable by way of an eccentric bearing means 21 which may be adjusted so as to adjust the position of the housing 19 and level means 17 with respect to the pin 20. This bearing 21 is situated within a sleeve 22 which forms a guide sleeve and which carries an exterior protective cover 23 capable of being placed on and removed from the guide sleeve 22. Between the bearing 21 and the housing 19 is situated an intermediate support member 24 whose configuration conforms to that of the housing 19 and that of the bearing 21. This intermediate disc or frustoconical member 24 may be made of plastic. After the protective cover 23 is removed, the level means 17 can be adjusted in any direction by turning of the eccentric bearing 21.

The illumination for the level means 17 is provided during daylight though an opening 25 which is formed in the housing 2. The telescope housing 2 carries at the outer end of the opening 25 a window 26, preferably in the form of a transparent plate of plastic, which closes the bottom end of the opening 25 and through which daylight can reach the level means 17.

Under conditions of darkness, however, the illumination of the level means is derived by way of an independent illuminating means, situated within the telescope housing. The illuminating means takes the form of an illuminating body 27, which is built into the telescope housing, and which preferably takes the form of a tritium tube. This illuminating means 27 is situated in a bore 28, which is formed in the housing 2. It is also possible to situate the illuminating means 27a within the level means 17a itself, if desired, as illustrated in FIG. 5.

The reticle plate 12 is also provided with an independent illuminating means 29, and this latter illuminating means extends circumferentially about the reticle plate 12. The carrier 13 is formed with recesses for accommodating the illuminating means 29, as is particularly apparent from FIG. 2.

The pair of illuminating means 27 and 29, as well as the prism bodies 10 and 11, are preferably fixed to metal parts by way of a synthetic resin cement. These metal components are themselves removably fixed with the telescope housing, as by suitable pins or screws. Thus, the illuminating means 29 can be cemented to projecting portions of the carrier 13. The prism body 10 can be cemented to a plate 30 (FIG. 2) which itself is removably fixed by screws 31 with a housing closure plate 32. The prism body 11 can be cemented onto the reticle housing 14. In this way an easy interchangeability of the components can be provided.

In order to seal the lenses of the optical means within the telescope housing, as well as to seal the closure plate 32 of the housing and the guide sleeve 22, it is preferred to use a sealing means which includes the sealing rings 33, 34, 35, and 36 in the form of suitable O-rings, so that during dis-assembly of the telescopic sight of the invention a renewed sealing with a suitable cement or the like is not required.

An intermediate member 37 is bolted to the closure plate 32 by way of screws 38, and it is this intermediate member 37 which is directly carried by the holder of the sight.

According to the embodiment of the invention which is illustrated in FIG. 4, the annular or arcuate illuminating means 29a for the reticle plate 12 is situated between the ocular assembly 3 and the reticle plate 12 within the reticle housing 14, so that with this embodiment the reticle plate is primarily illuminated from behind. Such an arrangement makes it possible to use a reticle plate with photographically applied scales in such a way that an exceedingly good visibility thereof is achieved. The illuminating means 29a is situated within an annular recess 14a which is formed in the reticle housing 14, and the illuminating means 29a can be directly cemented to the housing 14 so as to be carried thereby.

What is claimed is:

1. In a telescopic gunsight for mortars, and the like, a telescope housing, optical means carried by said housing for providing a viewing field, said optical means including a rear ocular assembly and a front objective assembly, a reticle plate disposed between the ocular and objective assemblies, the diameter of the field of view through the ocular assembly substantially exceeding that of the reticle plate, level means carried by said housing radially outwardly of the field of view through the ocular assembly for indicating the attitude of the housing, image-transmitting means carried by said housing for transmitting an image of said level means into the viewing field provided by said optical means, and illuminating means carried by said housing for illuminating said level means, said level means including a level housing situated within said telescope housing, a pin carried by said telescope housing and engaging said level housing to support the latter for turning movement, and means carried by said telescope housing and coacting with said level housing at a location spaced longitudinally of the telescope housing from the pin to adjust the angular position of said level means in said telescope housing.

2. The combination of claim 1, comprising means for making the level means visible day and night including, respectively, an opening in the wall of the housing, and a self-contained illuminating means disposed in a recess in the housing out of the field of view covered by the ocular.

3. The combination of claim 1, comprising second illuminating means coacting with said reticle plate for illuminating the latter, both of said illuminating means being self-illuminating, so that an outside source of energy is not required for either one of said illuminating means.

4. The combination of claim 1, wherein said telescope housing has a closure plate and carries a guide sleeve in which said level means is guided, said guide sleeve, said closure plate, said ocular assembly, and said objective assembly all being accessible at the region of the exterior of said telescope housing, and sealing means carried by said housing for sealing said guide sleeve, closure plate, ocular assembly, and objective assembly, said sealing means including sealing rings for sealing off said guide sleeve, said closure plate, said ocular assembly, and said objective assembly from the exterior of said housing.

5. The combination of claim 1, wherein the means to adjust the angular position of said level means in said telescope housing comprises an adjustable eccentric bearing means carried by said telescope housing and coacting with said level housing.

References Cited
UNITED STATES PATENTS

| | | | |
|---|---|---|---|
| 1,032,379 | 7/1912 | Cole | 33—50.5UX |
| 1,270,771 | 7/1918 | Bausch | 350—10 |
| 1,875,830 | 9/1932 | Suverkrop | 356—143 |
| 2,173,142 | 9/1939 | Thurlow et al. | 356—249 |
| 2,476,340 | 7/1949 | Wallhausen | 33—50.5X |

RONALD L. WIBERT, Primary Examiner

O. B. CHEW II, Assistant Examiner

U.S. Cl. X.R.

33—50